(12) United States Patent
Metsker

(10) Patent No.: US 7,467,245 B2
(45) Date of Patent: Dec. 16, 2008

(54) PCI ARBITER

(75) Inventor: Corey Metsker, Clinton, OH (US)

(73) Assignee: Cisco Technology, Inc.

( * ) Notice: Subject to any disclaimer, the term of this patent is extended or adjusted under 35 U.S.C. 154(b) by 222 days.

(21) Appl. No.: 11/187,270

(22) Filed: Jul. 22, 2005

(65) Prior Publication Data

US 2007/0022238 A1 Jan. 25, 2007

(51) Int. Cl.
G06F 13/00 (2006.01)
G06F 13/36 (2006.01)
G06F 13/362 (2006.01)

(52) U.S. Cl. ................ 710/107; 710/113; 710/116

(58) Field of Classification Search ............ 710/1, 710/22, 33, 107, 110, 111, 113, 114, 116, 710/243, 244, 310; 713/600; 370/447, 461, 370/463, 468; 455/450, 562.1
See application file for complete search history.

(56) References Cited

U.S. PATENT DOCUMENTS

| | | | | |
|---|---|---|---|---|
| 4,953,081 A * | 8/1990 | Feal et al. | ............. | 710/111 |
| 5,361,370 A * | 11/1994 | Sprague et al. | ............. | 712/22 |
| 5,438,666 A * | 8/1995 | Craft et al. | ............. | 710/22 |
| 5,802,330 A * | 9/1998 | Dutton | ............. | 710/116 |
| 5,805,905 A * | 9/1998 | Biswas et al. | ............. | 710/244 |
| 5,841,778 A * | 11/1998 | Shaffer et al. | ............. | 370/447 |
| 5,862,353 A * | 1/1999 | Revilla et al. | ............. | 710/107 |
| 5,862,355 A * | 1/1999 | Logsdon | ............. | 710/116 |
| 5,915,104 A * | 6/1999 | Miller | ............. | 710/310 |
| 5,956,493 A * | 9/1999 | Hewitt et al. | ............. | 710/113 |
| 6,188,699 B1 * | 2/2001 | Lang et al. | ............. | 370/463 |
| 6,463,488 B1 * | 10/2002 | San Juan | ............. | 710/107 |
| 6,463,490 B1 * | 10/2002 | Wang et al. | ............. | 710/110 |
| 6,516,369 B1 | 2/2003 | Bredin | | |
| 6,693,914 B1 * | 2/2004 | Jones et al. | ............. | 370/461 |
| 6,704,821 B2 * | 3/2004 | Scandurra et al. | ............. | 710/243 |
| 6,721,833 B2 * | 4/2004 | Lai et al. | ............. | 710/113 |
| 6,889,276 B2 * | 5/2005 | Brown | ............. | 710/114 |
| 6,961,793 B2 * | 11/2005 | Kato | ............. | 710/113 |
| 6,973,520 B2 * | 12/2005 | Drerup et al. | ............. | 710/110 |
| 7,035,277 B1 * | 4/2006 | Batcher | ............. | 370/447 |
| 7,099,671 B2 * | 8/2006 | Liang | ............. | 455/450 |
| 7,099,968 B2 * | 8/2006 | Rengarajan | ............. | 710/107 |

(Continued)

OTHER PUBLICATIONS

PCI Special Interest Group, PCI Local Bus Specification, Dec. 18, 1998, PCI-SIG, Revision 2.2, pp. 68-88.*

*Primary Examiner*—Mark Rinehart
*Assistant Examiner*—Thomas J Cleary
(74) *Attorney, Agent, or Firm*—Tucker Ellis & West, LLP

(57) ABSTRACT

A bus arbiter that ensures high priority transfers complete and allows high-priority data transfers with specific latency requirements, such as 802.11 requirements, to be prioritized above data transfers with lower latency requirements. As an example, the arbiter closely manages all transactions and guarantees sufficient latencies by pre-empting lower-priority data transfers with higher priority data transfers. All devices on the bus are configured with a latency timer setting of zero or a non-zero value which guarantees required data transfer latencies are met which means that any device will terminate bus-master transfers quickly upon the bus grant signal being de-asserted. To ensure a transfer completes, bus grant for the priority transfer is asserted until entire data transfer completion is imminent, enabling transfers, such as high priority transfers, to complete uninterrupted.

14 Claims, 7 Drawing Sheets

U.S. PATENT DOCUMENTS

| | | |
|---|---|---|
| 7,155,631 B2* | 12/2006 | Kiriake ........................ 713/600 |
| 7,190,974 B2* | 3/2007 | Efland et al. .............. 455/562.1 |
| 2003/0231655 A1* | 12/2003 | Kelton et al. ................. 370/468 |
| 2004/0122985 A1* | 6/2004 | Parra et al. ...................... 710/1 |
| 2006/0282560 A1* | 12/2006 | Bell et al. ...................... 710/33 |

* cited by examiner

PCI ARBITER

BACKGROUND OF THE INVENTION

The present invention relates generally to bus arbitration and more specifically for a custom PCI arbiter.

There are limitations in the standard PCI (Peripheral Component Interconnect) arbitration scheme as well as standard microprocessor PCI arbitration implementations which limit the guaranteed latency with which a specific data packet can be transferred across the PCI bus, for example between host and radio MAC (Media Access Control) devices. This non-optimal data transfer latency limits performance (multi-radio simultaneous burst throughput) as well as features (power-save, multicast) in an enterprise class access point system. Additionally, system cost is increased because radio MAC packet storage space must be large because there is not a mechanism available to fetch data packets from host DRAM in a timely manner.

While the raw throughput of the PCI bus may be sufficient to support such applications, the limitation of a system with a standard PCI arbiter employing standard radio chipsets (client class) and standard microprocessor is that high-priority DMA-based data transfers cannot be effectively prioritized over those data transfers without specific latency requirements. The PCI specification only provides a mechanism to provide bus ownership based on the device which is requesting the bus; however, it does not allow bus ownership to be assigned based on the type of data which needs to be transferred. This is a fundamental limitation of the PCI arbitration scheme as defined by the PCI specification.

The PCI specification has fundamental limitations with regard to arbitration for PCI bus mastering ownership. For example, the PCI specification has no mechanism for prioritizing bus control (bus master) to devices based upon classification of data type which needs to be transferred—prioritization can only be done on a per-device basis. Furthermore, the PCI specification has no mechanism for optimizing bus-master switching overhead by being aware of latency requirements of individual data types, rather, all bus allocation algorithms are performed only with a general knowledge of the requesting device and without specific knowledge of the data being transferred.

Moreover, standard PCI arbiter designs common to integrated MPU designs have other limitations. For example, the standard PCI arbiter has no ability to prioritize a higher-priority data transfer with specific latency requirements over a data transfer with less stringent timing requirements—rather the standard PCI arbiter employs a fair or weighted round-robin arbitration scheme providing a static allocation of bus bandwidth to each device A round-robin time-sliced arbitration scheme does not optimize bus efficiency due to switching overhead because bus cycles are wasted switching between devices unnecessarily and look-ahead pre-fetches of data are wasted when bus master is switched.

These limitations in the PCI arbitration scheme can impact the performance of devices using PCI systems. For example, an 802.11 access point has limited Radio MAC memory space, thus a low-latency transfer of certain data types from host memory is necessary to meet performance and feature-set requirements of an enterprise class access point system. The standard PCI arbitration as defined by the PCI specification and implemented in standard universal MPU designs does not allow the bus-transfer latency requirements to be met. Moreover, this problem is magnified as number of radios per system is increased.

BRIEF SUMMARY OF THE INVENTION

The present invention is directed to a system and method for performing bus arbitration for a bus that uses bus-mastering, such as a PCI bus. In accordance with an aspect, all bus devices initiate signals, such as digital signals, that indicate the type of data being transferred, e.g., high priority, low priority, and may explicitly or implicitly indicate latency requirements for the data being transferred. The arbiter grants bus ownership based on priority of the data being transferred. In accordance with an aspect, devices on the bus may be configured with a latency timer setting of zero, which means that any device having ownership of the bus will terminate bus-master transfers immediately upon a bus grant signal being de-asserted. Thus, the arbiter can change ownership to a high priority device within a few clock cycles. In accordance with an aspect of the present invention, the bus arbiter maintains bus grant until either the entire data transfer completion is imminent or a higher-priority data transfer pre-empts the transfer in progress. High-priority time-critical data transfers can complete uninterrupted without sharing bus bandwidth with lower-priority data transfers with less stringent latency requirements.

In accordance with an aspect of the present invention, there is described herein a method for a bus arbiter to control access to a bus. The arbiter receives a bus access request and asserts a bus grant associated with the bus access request until entire data transfer completion is imminent or the transfer is pre-empted by one of higher priority. Optionally and/or alternatively, the method can further comprise setting the latency timer for devices on the bus to zero. Any device on the bus with its latency timer set to zero will immediately terminate bus-master transfers as soon as the bus grant signal is de-asserted. Therefore, when the bus arbiter receives a second bus access request with a higher priority than the first bus access request, the bus arbiter de-asserts the bus grant associated with the first bus access request and asserts a bus grant to the device associated with the second bus access request signal.

In accordance with an aspect of the present invention, there is described herein a system with a bus arbiter coupled to a bus for controlling access to the bus. The bus is also coupled to a first device and a second device. The system further comprises at least one coupler between the bus arbiter and the first device for asserting at least one of the group consisting of a bus access request signal and a bus grant signal between the bus arbiter and the first device, and at least one coupler between the bus arbiter and the second device for asserting at least one of the group consisting of a bus access request signal and a bus grant signal between the bus arbiter and the second device. The bus arbiter sets a latency timer for the first device and a latency timer for the second device to zero to guarantee minimum latency of other devices. Alternatively, latency timers of devices are set to some non-zero value as appropriate to guarantee appropriate system latencies. The bus arbiter is responsive to a bus access request signal from the first device to assert and hold bus grant to the first device until completion of entire data transfer is imminent.

In accordance with an aspect of the present invention, there is described herein a multi-transceiver system, comprising a first wireless transceiver, a second wireless transceiver, a host unit comprising a host memory for storing packets for the first wireless transceiver and the second wireless transceiver, a bus coupling the host processor to the first radio transceiver and the second radio transceiver, and a bus arbiter for controlling access to the bus, the bus arbiter coupled to the host unit, first wireless transceiver and second wireless transceiver. The bus arbiter is responsive to a bus access request from the first wireless transceiver to retrieve a packet from the host memory to assert bus grant until the completion of entire data transfer is imminent.

In accordance with an aspect of the present invention, there is described herein a bus arbiter, comprising means for receiving a bus access request from a plurality of devices coupled to the bus, and means for responding to a bus access request from a one of the plurality of devices coupled to the bus. The means for responding to a bus access request asserts and holds a bus grant to the one of the plurality of devices coupled to the bus until completion of entire data transfer is imminent.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
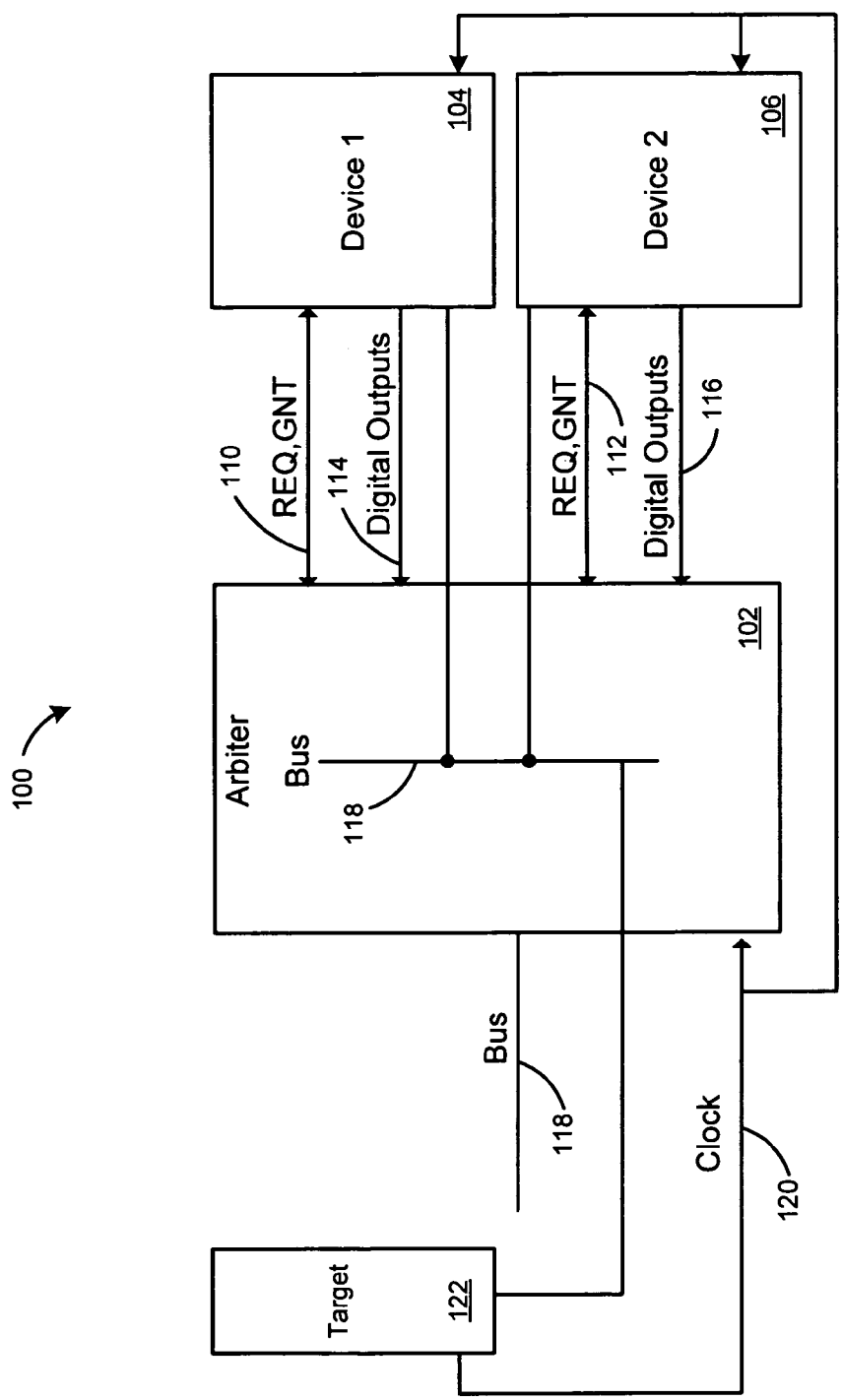
FIG. 1 is a block diagram of a bus system employing a bus arbiter.

Throughout this description, the preferred embodiment and examples shown should be considered as exemplars, rather than limitations, of the present invention. The present invention is directed to a system and method for performing bus arbitration on a bus that employs bus-mastering, such as a PCI bus. Referring to FIG. 1, there is illustrated a block diagram of a bus system 100 employing a bus arbiter 102 for controlling ownership of a bus 118. Bus arbiter is suitably a complex programmable logic (CPLD) device. Alternatively, the functionality of arbiter 102 can be implemented in other devices such as a central processing unit (CPU) or another application specific integrated circuit (ASIC) device. Bus arbiter 102 comprises logic for determining which device, e.g., devices 104 and 106, is grated ownership of bus 118. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Arbiter 102 is coupled to a first device (DEVICE 1) 104 via couplers 110, 114. Coupler 110 is used for sending bus access requests (REQ) and bus grants (GNT) between arbiter 102 and first device 104. Coupler 114 (Digital Outputs) is used by first device 104 for informing bus arbiter 102 the priority of a bus access request being asserted on coupler 110. Couplers 110, 114 are suitably any means that enables communication between first device 104 and bus arbiter 102, including but not limited to wired and/or wireless communication links. Furthermore, coupler 110 can use a single coupler bus access requests (REQ#) and bus grants (GNT#), or coupler 110 can further comprise separate conductors for REQ# and GNT#. When first device 104 desires access to bus 118, it notifies arbiter 102 by asserting a bus access request (REQ#) on coupler 110. When arbiter 102 is ready to grant first device 104 access to bus 118, arbiter 102 asserts a bus grant (GNT#) which first device 104 receives via coupler 110. For systems employing priority based arbitration, first device 104 sends a signal on coupler 114 indicating the priority of the bus access request being sent on coupler 110.

Arbiter 102 is coupled to a second device (DEVICE 2) 106 via couplers 112, 116. Coupler 112 is used for sending bus access requests (REQ) and bus grants (GNT) between arbiter 102 and second device 106. Coupler 116 (Digital Outputs) is used by second device 106 for informing bus arbiter 102 the priority of a bus access request being asserted on coupler 112. Couplers 112, 116 are suitably any means that enables communication between first device 104 and bus arbiter 102, including but not limited to wired and/or wireless communication links. Furthermore, coupler 112 can use a single coupler bus access requests (REQ#) and bus grants (GNT#), or coupler 112 can further comprise separate conductors for REQ# and GNT#.

When second device 106 desires access to bus 118, it notifies arbiter 102 by asserting a bus access request (REQ#) on coupler 112. When arbiter 102 is ready to grant second device 106 access to bus 118, arbiter 102 asserts a bus grant (GNT#) which second device 106 receives via coupler 112. For systems employing priority based arbitration, second device 116 sends a signal on coupler 116 indicating the priority of the bus access request being sent on coupler 112.

As illustrated in FIG. 1, a clock signal 120 provides a timing reference for all bus transactions. Clock signal 120 is coupled to bus arbiter 102, first device 104 and second device 106.

The operation of system 100 will now be explained. The operations will illustrate transfers between first device 104 and target device 122 and second device 106 and target device 122. Although as illustrated, only three devices are coupled to bus 118, system 100 is suitably adaptable to as few as two devices, or to as many devices as bus 118 is capable of handling. The operation of system 100 will be explained with reference to the PCI bus, however system 100 is suitable to any bus-mastering system. PCI is a synchronous bus architecture with data transfers being performed relative to a system clock (CLK). The initial PCI specification permitted a maximum clock rate of 33 MHz allowing one bus transfer to be performed every 30 nanoseconds. Later, Revision 2.1 of the PCI specification extended the bus definition to support operation at 66 MHz, but the vast majority of today's personal computers continue to implement a PCI bus that runs at a maximum speed of 33 MHz. PCI implements a 32-bit multiplexed Address and Data bus (AD[31:0]), although it is capable of supporting a 64-bit data bus through a longer connector slot, but most of today's personal computers support only 32-bit data transfers through the base 32-bit PCI connector.

The multiplexed Address and Data bus allows a reduced pin count on the PCI connector that enables lower cost and smaller package size for PCI components. Typical 32-bit PCI add-in boards use only about 50 signals pins on the PCI connector of which 32 are the multiplexed Address and Data bus. PCI bus cycles are initiated by driving an address onto the AD[31:0] signals during the first clock edge called the address phase. The address phase is signaled by the activation of the FRAME# signal. The next clock edge begins the first of one or more data phases in which data is transferred over the AD[31:0] signals.

In PCI terminology, data is transferred between an initiator which is the bus master, and a target which is the bus slave. The initiator drives the C/BE[3:0]# signals during the address phase to signal the type of transfer (memory read, memory write, I/O read, I/O write, etc.). During data phases the C/BE [3:0]# signals serve as byte enable to indicate which data bytes are valid. Both the initiator and target may insert wait states into the data transfer by de-asserting the IRDY# and TRDY# signals. Valid data transfers occur on each clock edge in which both IRDY# and TRDY# are asserted.

A PCI bus transfer consists of one address phase and any number of data phases. I/O operations that access registers within PCI targets typically have only a single data phase. Memory transfers that move blocks of data consist of multiple data phases that read or write multiple consecutive memory locations. Both the initiator and target may terminate a bus transfer sequence at any time. The initiator signals completion of the bus transfer by de-asserting the FRAME# signal during the last data phase. A target may terminate a bus transfer by asserting the STOP# signal. When the initiator detects an active STOP# signal, it must terminate the current bus transfer and re-arbitrate for the bus before continuing. If STOP# is asserted without any data phases completing, the target has issued a retry. If STOP# is asserted after one or more data phases have successfully completed, the target has issued a disconnect.

Initiators (e.g., first device 104 and/or second device 106) arbitrate for ownership of the bus by asserting a REQ# signal to a central arbiter. The arbiter grants ownership of the bus by asserting the GNT# signal. Bus Access Request REQ# is used by a PCI device to request use of the bus. Each PCI device has its own unique REQ# signal. The arbiter in the PCI system receives the REQ# signals from each device. This signal is implemented only by devices capable of being an initiator. Bus grant (GNT#) indicates that a PCI device's request to use the bus has been granted. Each PCI device has its own unique GNT# signal from the PCI system arbiter. If a device's GNT# signal is active during one clock cycle, then the device may begin a transaction in the first clock cycle in which bus state is idle by asserting the FRAME# signal. This signal is implemented by devices capable of being an initiator.

Initiator Ready (IRDY#) is driven low by the initiator (e.g., device 1 104 and/or device 2 106) as an indication it is ready to complete the current data phase of the transaction. During writes it indicates the initiator has placed valid data on AD[31:0]. During reads it indicates the initiator is ready to accept data on AD[31:0]. Once asserted, the initiator holds IRDY# low until TRDY# has been driven low the appropriate number of clocks to complete the desired transfer, or the target uses the STOP# signal to terminate without performing the complete data transfer. IRDY# permits the initiator to insert wait states as needed to slow the data transfer. When the target device (e.g., target 122) is ready to accept data, it asserts a Target Ready (TRDY#). TRDY# is asserted by in a low state. During reads it indicates the target has placed valid data on the AD[31:0] signals. Once asserted, the target holds TRDY# low until IRDY# is driven low to complete the transfer. TRDY# permits the target to insert wait states as needed to slow the data transfer.

Stop (STOP#) is driven low by the target to request the initiator terminate the current transaction. In the event that a target requires a long period of time to respond to a transaction, it may use the STOP# signal to suspend the transaction so the bus can be used to perform other transfers in the interim. When the target terminates a transaction without performing any data phases it is called a retry. If one or more data phases are completed before the target terminates the transaction, it is called a disconnect. A retry or disconnect signals the initiator that it must return at a later time to attempt performing the transaction again. A problem with this procedure is that if the initiator is attempting to meet a latency requirement, the bus may be busy before the initiator can retry the transaction. As will be explained herein infra an aspect of the present invention prevents this problem from occurring.

In the event of a fatal error such as a hardware problem the target may use STOP# and DEVSEL# to signal an abnormal termination of the bus transfer called a target abort. The initiator can use the target abort to signal system software that a fatal error has been detected.

For example, if first device 104 wishes to initiate a bus transfer with target 122, it asserts a bus access request ("request" or REQ#) on coupler 110 to bus arbiter 102. When bus arbiter 102 is ready to grant access to first device 104, it asserts a bus grant (GNT#) on coupler 110. Ordinarily, bus arbiter 102 would grant access to the next device requesting access on the bus (e.g., second device 106) once first device 104 asserts FRAME#. However, in accordance with an aspect of the present invention, if bus arbiter 102 wishes to ensure the transfer initiated by first device 104 fully completes, bus arbiter 102 holds the GNT# until the entire data transfer completion is known to be imminent. Knowlege of imminent data transfer completion is system dependent, but could be marked by either: (1) REQ# is de-asserted indicating that initiating device no longer has data to transfer across the bus or (2) the IRDY# signal is asserted by first device 104 and the TRDY# signal is initiated by target device 122 for some number of clock cycles indicating some number of data phases completed.

The PCI specification only allows for bus ownership to be granted based on the device which is requesting the bus. For example, protocols allocating bus ownership between the first device 104 and second device 106 would be based solely on which devices are currently requesting the bus. Bus allocation would be based on a time-sliced protocol using either a fair of weighted round-robin algorithm. A problem with this scenario is that there may be times when second device 106 needs the full bandwidth of bus 118, for example a buffer overflow may be ready to occur or second device 106 has traffic with a latency requirement that is about to expire. If first device 104 is only performing a routine task, under the PCI specification second device 106 could be starved from achieving the necessary throughput rate on bus 118 when the Device 104 is consuming valuable bus bandwidth on bus 118 transferring data without specific latency requirements. However, an aspect of system 100 is that by using additional couplers 114, 116, prioritization can be determined by type of bus traffic, and not just by device alone. For example, when first device 104 make a bus access request on coupler 110, it can send a signal on coupler 114, such as a digital signal, indicating the priority level of the bus access request on coupler 110. Likewise, when second device 106 make a bus access request on coupler 112, it can send a signal on coupler 116, such as a digital signal, indicating the priority level of the bus access request on coupler 112. This enables bus arbiter 102 to grant access to bus 118 based on the latency requirements of the particular data type rather than simply based on the requesting device. This aspect provides additional flexibility in prioritizing bus access. A typical PCI connector pinout comprises 98 pins, some of which are reserved. Thus, preferably couplers 114, 116 can be implemented on an unused (reserved) pin, however, it is also contemplated that couplers 114, 116 can be external to the PCI pinout.

When bus arbiter 102 receives prioritization data from bus devices, e.g., first device 104 and second device 106, bus arbiter 102 can preempt a device that is current bus-master for a higher priority transfer. Each device on the PCI bus has a latency timer (not shown). Under the PCI specification, bus arbiter 102 asserts GNT# to a device (e.g., first device 104) at least until FRM# is asserted by the device. Once GNT# is removed, the device is bus master until either, (1) transfer is completed, (2) transfer is terminated by the target issuing a retry, (3) latency timer expires, or (4) the initiator aborts early. Bus arbiter 102 can set the latency timer for devices 104, 106, 122 to zero. Then when bus arbiter 102 de-asserts grant, the device that is currently bus-master relinquishes the bus. This aspect is useful for very quickly preempting low priority transfers for a high priority transfer. If latency timer is set to zero for a given device, then entire data transfer must complete prior to de-asserting GNT#. If arbiter has detailed knowledge of the data transfers in the system then the transfer is known to be complete when a given number of clocks with IRDY# and TRDY# both asserted occur. Alternatively, the data transfer can be considered to be complete when the initiating device no longer requests control of the bus and de-asserts REQ#. An alternative to setting a devices latency timer to zero, is to set the latency timer to a non-zero value which still insures that system latency requirements are met. This allows GNT# to the active bus master to be de-asserted and GNT# to another requesting device to be asserted while data transfer initiated by the current bus master is still completing. This operation requires the arbiter to have knowledge of the size of data being transferred and knowledge of system data flow timing. Typically, an arbiter would know that the entire data transfer completion is imminent when data from within the final cacheline is transferred on a clock with IRDY# and TRDY# asserted. Setting a nonzero latency timer which allows system latency requirements to still be met, has the advantage of minimizing bus master switching overhead by allowing the grant lines to switch during the final data phases of a prioritized data transfer.

For example, arbiter 102 receives a REQ# from first device 104 via coupler 110 along with a corresponding priority signal on coupler 114 and asserts GNT#. If second device 106 desires access to the bus for a high priority traffic, then second device 106 signals bus arbiter 102 by sending a REQ# on coupler 112 and sends a priority signal on coupler 116. If the priority signal on coupler 116 is a higher priority than the bus transfer currently being executed by first device 104, then bus arbiter 102 de-asserts GNT# to first device 104, and because the latency timer is set to zero, first device 104 immediately relinquishes the bus. Bus arbiter 102 then asserts GNT# to second device 106 allowing it to become bus-master. However, if in the preceding example the priority level for second device 106 is lower than the priority level for first device 104, then bus arbiter 102 maintains GNT# to first device 104. Bus arbiter 102 maintains the signal until the transfer initiated by first device 104 is complete, or aborted by initiator, and then bus arbiter 102 asserts GNT# to second device 106.

In describing a PCI system in connection with FIG. 1, the type of bus can be any one of the group consisting of a PCI version 3.0 compliant bus, a PCI version 2.0 compliant bus, a PCI version 2.1 compliant bus, a PCI version 2.2 complaint bus, a PCI version 2.3 compliant bus a PCI version 1.0 compliant bus, a miniPCI compliant bus and a CardBus compliant bus, but is not limited to only these bus types.

Figure 2:
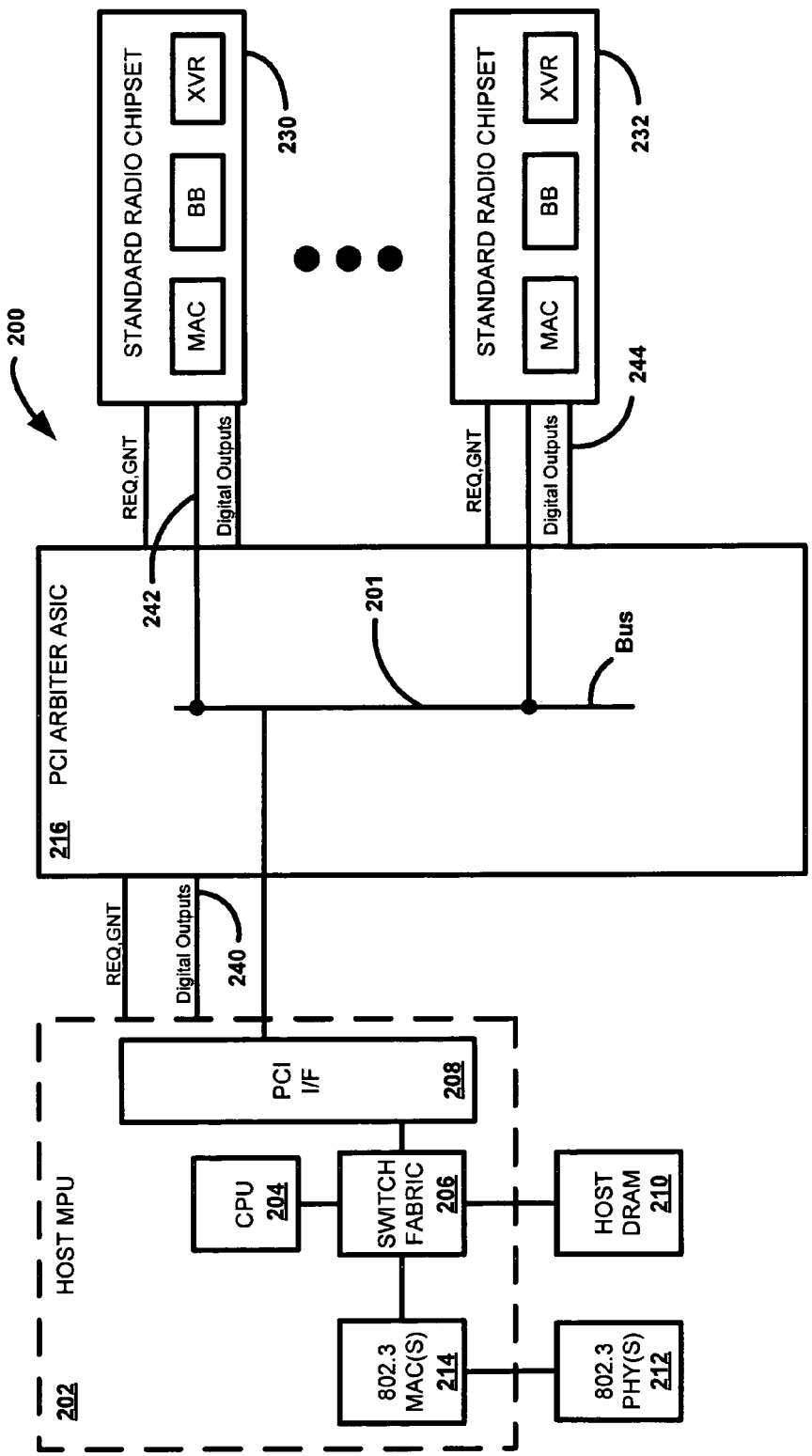
FIG. 2 is a block diagram of a wireless transceiver with a host and a plurality of transceivers sharing a bus.

FIG. 2 is a block diagram of a multi-wireless transceiver system 200 with a host MPU 202 and a plurality of wireless transceivers 230, 232 sharing a bus 201. Arbiter 216, e.g., a PCI Arbiter ASIC, manages access to bus 201. Although only two wireless transceivers 230, 232 are illustrated, this is merely for ease of explanation as system 200 is capable of supporting any number of additional wireless transceivers.

The multi-transceiver system 200 configuration of FIG. 2 is frequently employed by a wireless local area network (WLAN) access point (AP). For purposes of explanation for FIG. 2, bus 201 is preferably a PCI compliant bus, although aspects of the present invention are suitably adaptable for any bus-mastering configuration.

Host MPU 202 receives packets from wireless transceivers 230, 232 to be forwarded to the network distribution system (not shown) and receives packets from the network distribution system to be transmitted by one or more of wireless transceivers 230 and 232. CPU 204 controls the operation of host MPU 202 and performs any packet processing, Switch fabric 206 routes packets within host MPU 202, for example between MAC 214 and Host DRAM 210, Host DRAM 210 and CPU 204 and/or host DRAM 210 and FIFO 208. In order to minimize system memory requirements, packets for wireless transceivers 230, 232 are stored in host DRAM 210 until needed by wireless transceivers 230, 232. This enables wireless transceivers 230, 232 to operate with smaller memories (not shown).

Each device coupled to bus 201, such as wireless transceivers 230, 232 and host MPU 202 are also coupled to arbiter 216.

Packets from the distribution network are received by PHY 212. PHY 212 suitably comprises one or more physical interfaces to the distribution network. For example if system 200 is coupled to two networks, then PHY 212 would comprise two physical layer interfaces. MAC 214 processes packets received by PHY 212. MAC 214 is adaptable to comprise a plurality of MAC interfaces. For example if system 200 is coupled to a plurality of network topologies, MAC 214 would comprise Media Access Control processors for the plurality of network topologies. For example, if the distribution system is an 802.3 (Ethernet) network, then PHY 212 would have at least one 802.3 PHY and MAC 214 would have at least one 802.3 MAC. Once the packet is processed by MAC 214, switch fabric 206 routes the packet to Host DRAM 210. Additional packet processing can be provided by CPU 204. CPU 204 can notify the wireless transceiver, e.g., one or more of wireless transceivers 230, 232, that the packet has been received along with any latency requirements.

When one of wireless transceivers 230, 232 is ready to transmit the packet, the transceiver requests the packet from Host MPU 202. For example, if wireless transceiver 230 desires to send the packet, it would send a bus access request (REQ#) to arbiter 216 for access to bus 201 so that the packet can be sent from host MPU 202 to wireless transceiver 230. When arbiter 216 is ready to grant access to bus 201 to wireless transceiver 230 it would respond with a grant (GNT#). Wireless transciever 230 iniates read of data from Host DRAM 210 through Host MPU 202.

In a typical PCI system, arbiter 216 would assert GNT# until the initiator, wireless transceiver 230 in this example, sends FRM#. Once FRM# is asserted, arbiter 216 would then assert GNT# to the next device requesting access to bus 201. Once GNT# is de-asserted, the device having current ownership of bus 201, wireless transceiver 230 in this example, retains ownership of the bus and continues to assert FRM# until a latency timer (not show) which is set by arbiter 216 expires or target device Host MPU 202 signals retry by asserting STOP#. PCI specification requires a target device to assert STOP# indicating a target retry within 16 clocks if valid data is not available and TRDY# cannot be asserted. A problem with this scenario is that due to congestion within host MPU 202, the packet may not be loaded into FIFO 208 before a target retry is signaled by host MPU 202 asserting STOP#. For example, there may be a delay in loading the packet from host DRAM 210 to FIFO 208 because switch fabric 206 is busy servicing requests from MAC 214, or CPU 204. If wireless transceiver 230 needs the packet quickly, for example if the packet has to be transmitted by a certain time frame to meet a QoS requirement, or wireless transceiver 230 is transmitting the packet with a beacon about to be sent, giving up bus 201 may cause the packet to be lost. If for example, wireless transceiver 232 is then granted access to bus 201 and is requesting a different packet from host MPU 202, FIFO 208 would flush the packet requested by wireless transceiver 230 and load the packet from host DRAM 210 for wireless transceiver 232. Even more problematic, is due to the same congestion problems that delayed the packet for wireless transceiver 230, the packet for wireless transceiver 232 may not load in time. This could result in wireless transceivers continuously requesting their packets and not receiving them.

As a solution to the aforementioned problems, arbiter 216 continues to assert GNT# after FRM# is asserted. GNT# can be asserted until the entire packet is guaranteed to be transferred to wireless transciever without target retry. With a latency timer setting of zero for wireless transciever, GNT# would be asserted either until REQ# is de-asserted or a known number of data phases have been transferred which complete the entire packet. With a non-zero latency timer setting, GNT# would be de-asserted when some known number of data phases have successfully completed which insure that entire packet will be transferred without a target retry occurring—this will allow GNT# to another device to be asserted prior to the end of an progress data transfer thus minimizing master switching overhead. Wireless transceiver 230 suitably comprises a MAC to perform any MAC processing and baseband (BB) processing to prepare the packet for transmission by transceiver XVR.

Digital outputs 240, 242, 244 are coupled to host MPU 202, wireless transceiver 230 and wireless transceiver 232 respectively to enable host MPU 202, transceiver 230 and wireless transceiver 232 to specify a priority level for a bus request. For a PCI system, digital outputs 240, 242, 244 are suitable to be employed on an unused (e.g., reserved) pin on the bus pinout, or a separate coupler external to the bus pinout can be used for digital outputs 240, 242, 244.

The current PCI protocol only implements bus control granting algorithms based on devices requesting bus control, for example wireless transceiver 230, wireless transceiver 232 and host MPU 202 are typically granted bus control based on a round-robin algorithm. A problem with this scenario is that a device performing data transfers without specific latency requirements may limit the effective bus bandwidth allocated to a device attempting to transfer data with critical latency requirements. For example, wireless transceiver 230 can be performing routine tasks while wireless transceiver 232 needs a packet to respond to a powersave clients unscheduled request or must send a packet to prevent to prevent receive buffer overflow. An aspect of digital outputs 240, 242 and 244 is that it enables arbiter 216 to determine if a device has a greater need for bus 201 than the device currently controlling all or a portion of bus 201 bandwidth, and accordingly grant dedicated access to bus 201 based on priority of the traffic, not the device, which also obviates the aforementioned shortcoming in the PCI protocol.

By setting latency timers to zero, arbiter 216 can quickly change access to bus 201 from a low priority task to a high priority task. For example, wireless transceiver 230 is currently controlling bus 201. When wireless transceiver 232 wants control of bus 201 it sends a bus access request (REQ#) with a priority level on digital output 244. Arbiter 216 then compares the priority level sent on digital output 244 with the priority level of the current transaction (for example when wireless transceiver 230 sent its REQ# the priority level sent on digital output 242, or if no priority level was sent on digital output 242 a default device priority level for wireless transceiver 230).

If in the preceding example the priority level for wireless transceiver 232 is higher than the priority level for wireless transceiver 230 (or the priority level used for the bus access request by wireless transceiver 230), arbiter 216 immediately de-asserts GNT# to wireless transceiver 230, and asserts GNT# to wireless transceiver 232. Because the latency timer for wireless transceiver 230 was set to zero, as soon as GNT# is de-asserted, wireless transceiver 230 immediately relinquishes bus 201, allowing wireless transceiver 232 to immediately become bus-master. However, if the priority level for the REQ# sent by wireless transceiver 232 is less than the priority level currently in effect for wireless transceiver 230, arbiter 216 continues to assert GNT# until the transfer initiated by wireless transceiver 230 is completed before de-asserting GNT# and asserting GNT# to wireless transceiver 232.

When a packet is received by wireless transceiver 230 or wireless transceiver 232 by its corresponding transceiver (XVR), any signal processing such as converting to baseband (BB) and MAC processing is performed within the wireless transceiver 230, 232 receiving the packet. The packet is then stored in a memory local to the transceiver receiving the packet. The transceiver receiving the packet sends a REQ# to arbiter 216 and waits for GNT#. For example, if the packet is received by wireless transceiver 230, wireless transceiver 230 asserts IRDY# when its ready to send the packet and host MPU 202 asserts TRDY# when its ready to receive the packet. The packet is subsequently sent via bus 201 to host MPU 202.

Host MPU may receive the packet in FIFO 208 (it should be noted that FIFO 208 can either be a single buffer or can comprise a plurality of buffers, some of which are dedicated to packets being sent by wireless transceivers 230, 232 and some of which are dedicated to packets being received by wireless transceivers 230, 232. The packet can be routed by switch fabric 206 to host DRAM for processing by CPU 204 and/or queuing to be sent to the distribution network via MAC 214 and PHY 212, or the packet can be forwarded directly to MAC 214 for transmission on the distribution network by PHY 212.

Arbiter 216 holds GNT# until the entire data packet has been transferred as indicated by either an appropriate number of data phases completed or REQ# de-asserted. This ensures the packet is delivered to host MPU 202, even if host MPU 202 is busy or unable to accept the packet immediately due to congestion. A benefit of this is that it ensures a packet with strict latency requirements is forwarded to MPU 202 immediately. Also, because wireless transceivers 230, 232 have limited memory capacity and depend on host DRAM 210 for additional storage, if a wireless transceiver is in danger of overflowing its memory, by using this technique arbiter 216 can ensure bus 201 is available to the transceiver so it can transfer the packet to host MPU 202 and prevent buffer overflow. Likewise, wireless transceivers 230, 232 can use digital outputs 242, 244 respectively to communicate a priority level to arbiter 216.

For example, if wireless transceiver 230 currently has ownership of bus 201 and wireless transceiver 232 is receiving packets and in danger of overflowing, wireless transceiver sends REQ# to arbiter 216 and a high priority level on digital output 244. When arbiter 216 receives REQ# from wireless transceiver 232 along with a high priority signal on digital output 244, arbiter 216 de-asserts GNT# to wireless transceiver 230 and asserts GNT# to wireless transceiver 232. If the latency timers are set to zero, wireless transceiver 230 will immediately relinquish the bus allowing wireless transceiver 232 to take over the bus.

Figure 3:
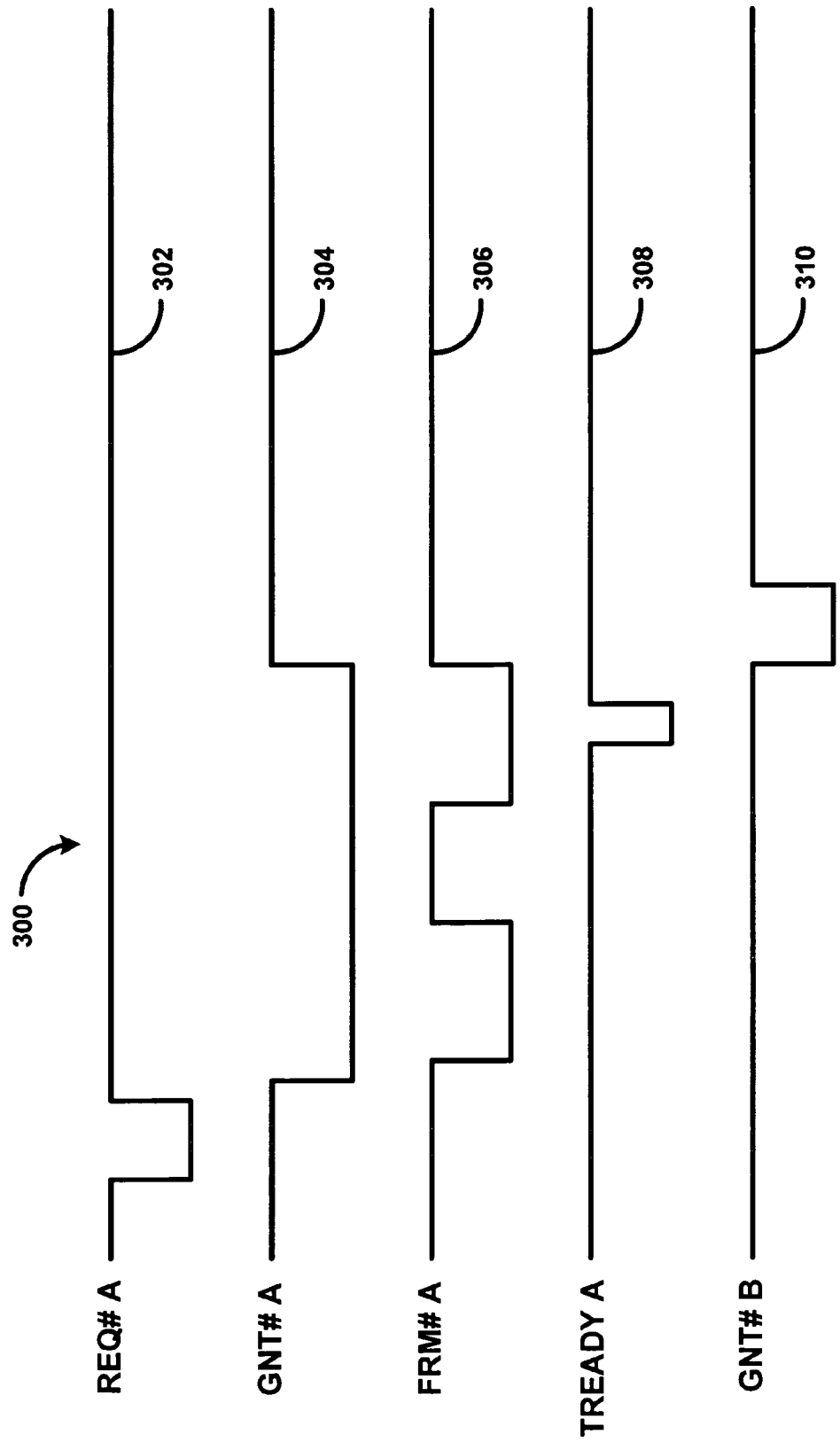
FIG. 3 is an exemplary timing diagram.

FIG. 3 is an exemplary timing diagram 300 in accordance with an aspect of the present invention. Timing diagram 300 illustrates how an arbiter, such as arbiter 216 (FIG. 2) or arbiter 102 (FIG. 1) can ensure a data transfer completes. In this example, a signal is asserted by a low signal and de-asserted or un-asserted by a high signal. As illustrated by signal 302, the arbiter receives REQ# from a device (A in this example). Signal 304 shows the GNT# signal for Device A. As can be observed it is asserted after REQ# A. Signal 306 illustrates the FRM# signal for device A, which as shown is asserted shortly after GNT# A and again before TRDY# A (signal 308) is asserted. When TRDY# A is asserted, then GNT# A is de-asserted and GNT# B is asserted. By contrast, in a typical PCI environment, once FRM# A is asserted, then a grant to device B, GNT# B would be asserted, and if TRDY# A is not asserted before STOP# is asserted, then the transfer would not complete. However, by holding GNT# A until TRDY# A is asserted, device B does not receive GNT# B until after TRDY# A is asserted, thus ensuring the device A's transfer completes.

Note that in the FIG. 3 example which is illustrative in nature, GNT#A is de-asserted upon the initial TRDY# assertion indicating that transfer is complete after a single data phase. However, the condition for GNT#A to be de-asserted could be some number of clock cycles with TRDY# and IRDY# both asserted comprising multiple data phases. The appropriate condition to de-assert GNT#A depends upon the system and data type being transferred.

Figure 4:
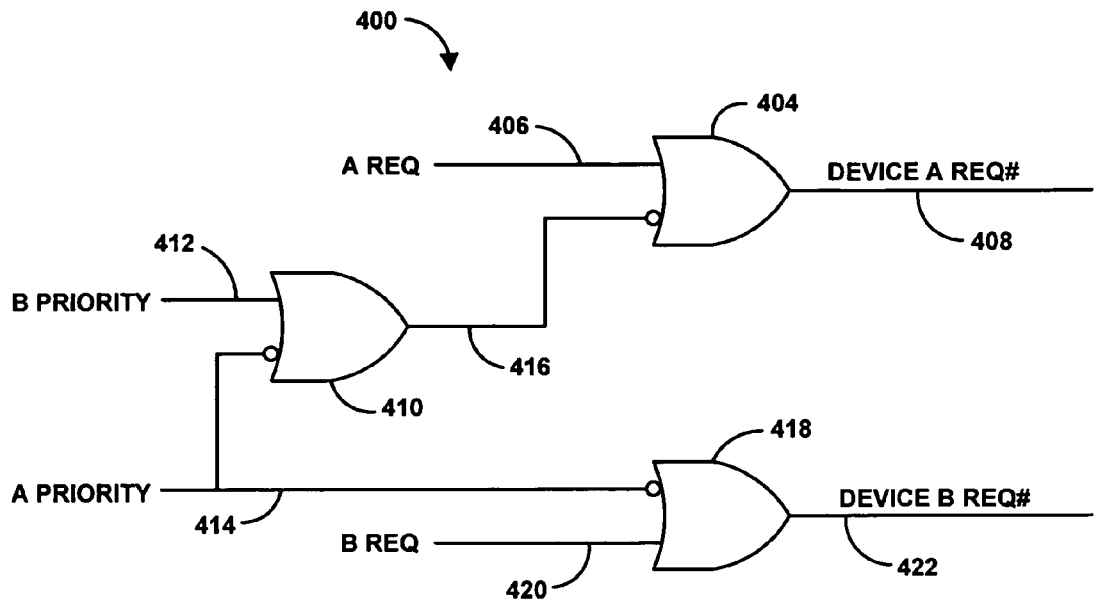
FIG. 4 is an exemplary request line prioritization circuit.

FIG. 4 is an exemplary request line prioritization circuit 400 and a truth table 402 corresponding to circuit 400. This example assumes that a signal is asserted by a low signal (Boolean 0) and un-asserted when high (Boolean 1). This example also assumes that a priority request 414 from device A has a higher priority than a priority request 412 from device B. Circuit 400 prioritizes a bus access request by inhibiting the request from reaching the bus arbiter, e.g, arbiter 102 (FIG. 1) and/or arbiter 216 (FIG. 2).

In this example, output (Device A REQ#) 408 of OR gate 404 is the bus access request signal for device A. The signal is asserted when the signal is low (logical 0). Similarly, output (Device B REQ#) 422 of OR gate 418 is the bus access request signal for device B. When device A wants access to the bus, Device A asserts A request signal (A REQ) 406 and if the request is a high priority request, a priority signal (A PRIORITY) 414. When device B wants access to the bus, Device B asserts a request signal (B REQ) 420 and if the request is a high priority request then device B also asserts a priority signal (B priority) 412.

OR gate 410 is used to mask B PRIORITY 412 if A PRIORITY 414 is asserted. Output 416 of OR gate 410 is input into an inverting input of OR gate 404. Thus, when output 416 is unasserted (high), the inverted input causes the signal is from 416 to be low, resulting in output 408 of OR gate 408 following A REQ 406. However, if output 416 of OR gate 410 is asserted (low), then the inverting input of OR gate 416 causes the signal to be interpreted as de-asserted (high), and output 408 of OR gate 404 will always be high, masking A REQ.

When A PRIORITY 414 is asserted (logical 0), because it is fed directly into an inverting input of OR gate 418, the DEVICE B REQ# 422 is always un-asserted (high) when A PRIORITY 414 is asserted. Also, when A PRIORITY 414 is asserted, it is fed into an inverting input of OR gate 410, making the output 416 high (logical 1), and when input into the inverting input of OR gate 404 is interpreted by OR gate 404 as logical low. Thus, A PRIORITY 414 always masks B REQ 420, and DEVICE A REQ# is the same as A REQ 406.

When A PRIORITY 414 is unasserted (logical 1), then because A PRIORITY 414 is fed into an inverting input of OR gate 410, output 416 of OR gate 410 is the same as B PRIORITY 412. So, when A PRIORITY 414 is unasserted and B priority is asserted, output 416 of OR gate 410 is logical 0, and because output 416 is input into an inverting input of OR gate 404, A REQ 406 is masked.

When both A PRIORITY 414 and B PRIORITY 412 are unasserted, then neither A REQ 406 nor B REQ 420 are masked from the arbiter. Because neither A REQ 406 nor B REQ 420 are high priority requests, the bus arbiter may receive both DEVICE A REQ# 420 and DEVICE B REQ# 422 at the same time and the arbiter can employ any technique, such as a round robin, first-in-first-out, and/or any type of queueing system, for servicing DEVICE A REQ# 408 and DEVICE B REQ# 422.

For example, When B PRIORITY 412 is asserted (logical 0) and A PRIORITY 414 is unasserted (logical 1), then because A PRIORITY 414 is input into an inverted input OR gate 410, output 416 of OR gate 412 logical 0. Because output 416 is fed into inverting input The aforementioned technique described for FIG. 4 is merely an exemplary method of masking a request signal, as there are many other techniques known in the art. See for example, application Ser. No. 09/652,511 filed Aug. 31, 2000, assigned to Cisco Technologies, Inc., the assignee of the present application. By using a masking technique such as shown in FIG. 4, prioritization of signals can be implemented using a bus arbiter that uses round robin or any other kind of prioritized or non-prioritized technique for processing bus access requests.

Figure 5:
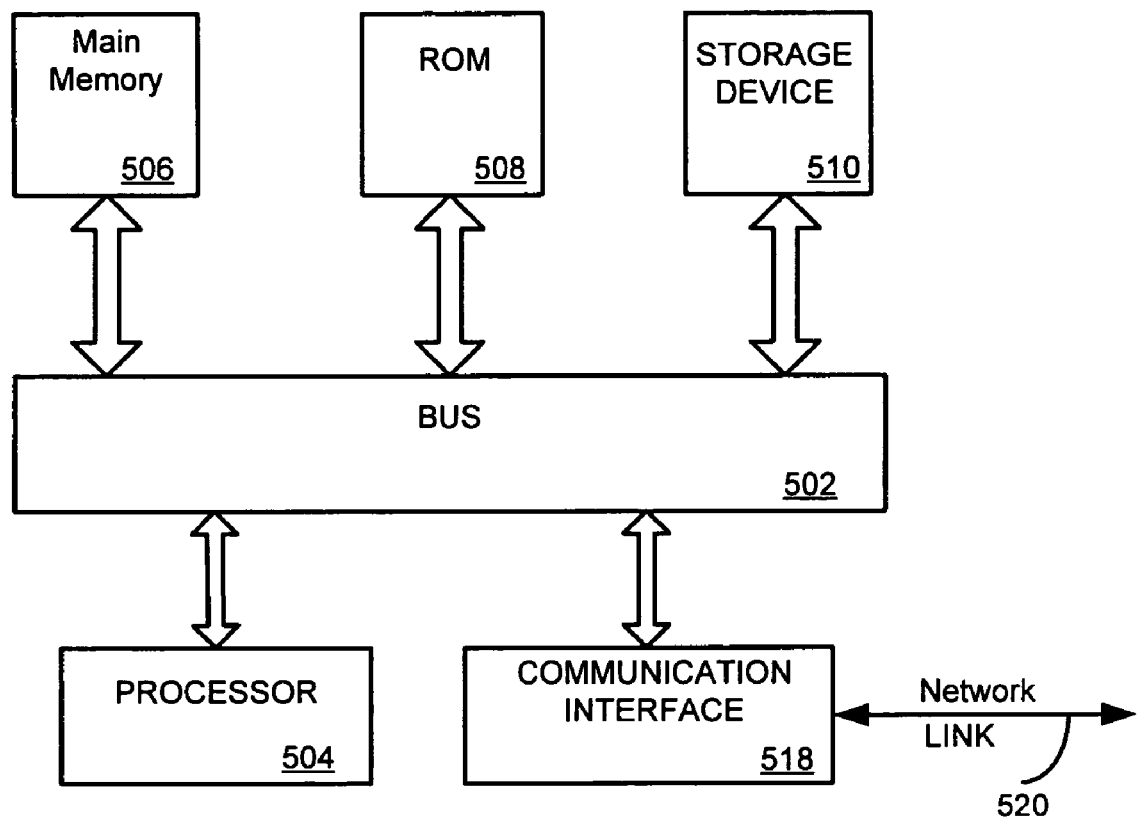
FIG. 5 is a block diagram of a computer system.

FIG. 5 is a block diagram that illustrates a computer system 500 upon which an embodiment of the invention may be implemented. Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

The invention is related to the use of computer system 500 for a custom arbiter. According to one embodiment of the invention, a custom arbiter is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave with instructions modulated thereon, or any other medium from which a computer can read. Communications link 520 typically provides data communication through one or more networks to other data devices.

Computer system 500 can send messages and receive data, including program codes, through the network(s) using network link 520, and communication interface 518. For example, software or computer executable code maybe received (e.g., downloaded) using communications link 420 and communication interface 518 downloaded, wherein the downloaded application provides for a custom arbiter as described herein.

The received code may be executed by processor 504 as it is received, and/or stored in storage device 510, or other non-volatile storage for later execution. In this manner, computer system 500 may obtain application code in the form of a carrier wave.

Figure 6:
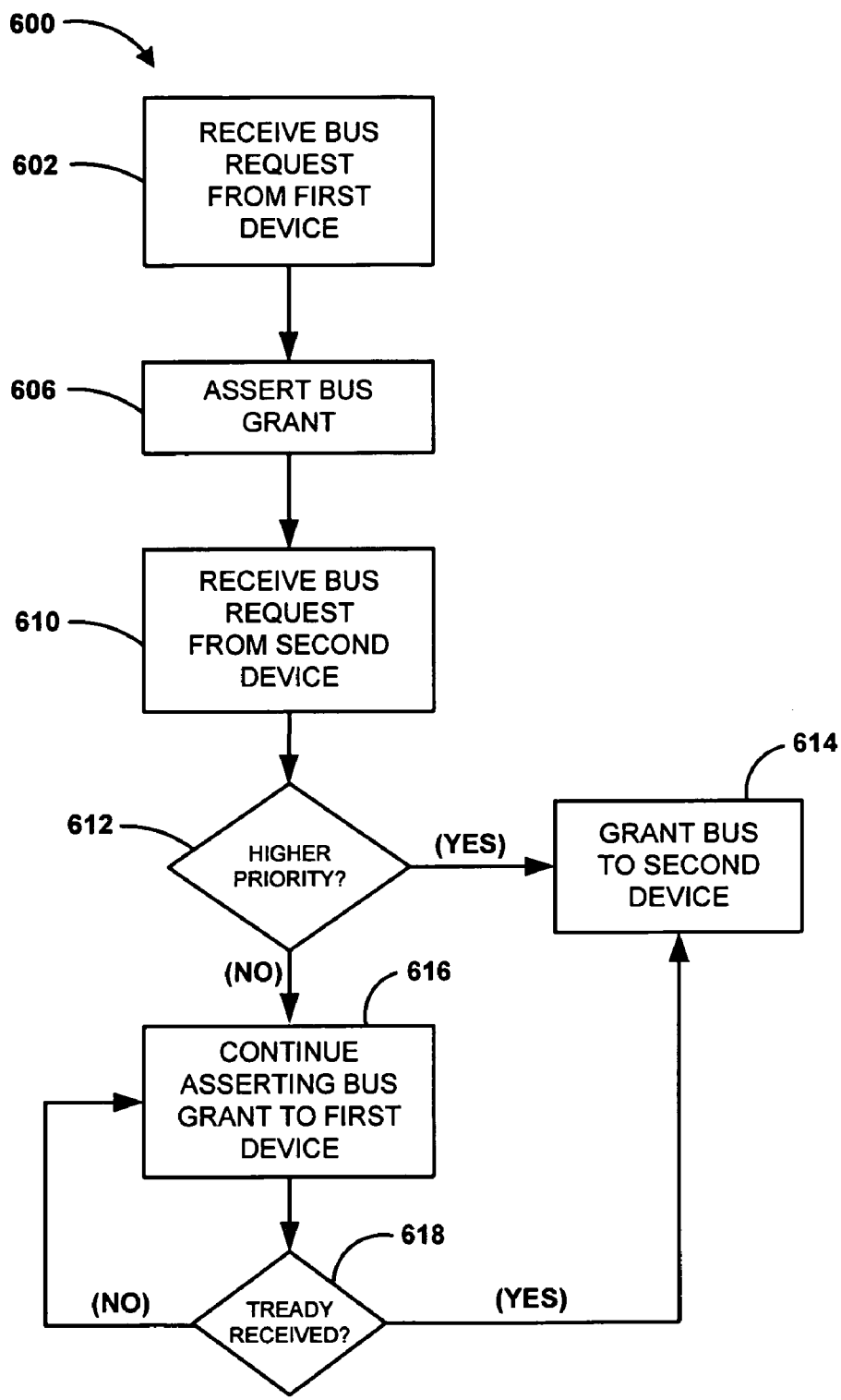
FIG. 6 is a block diagram of a method for controlling access to a bus using prioritization.
Figure 7:
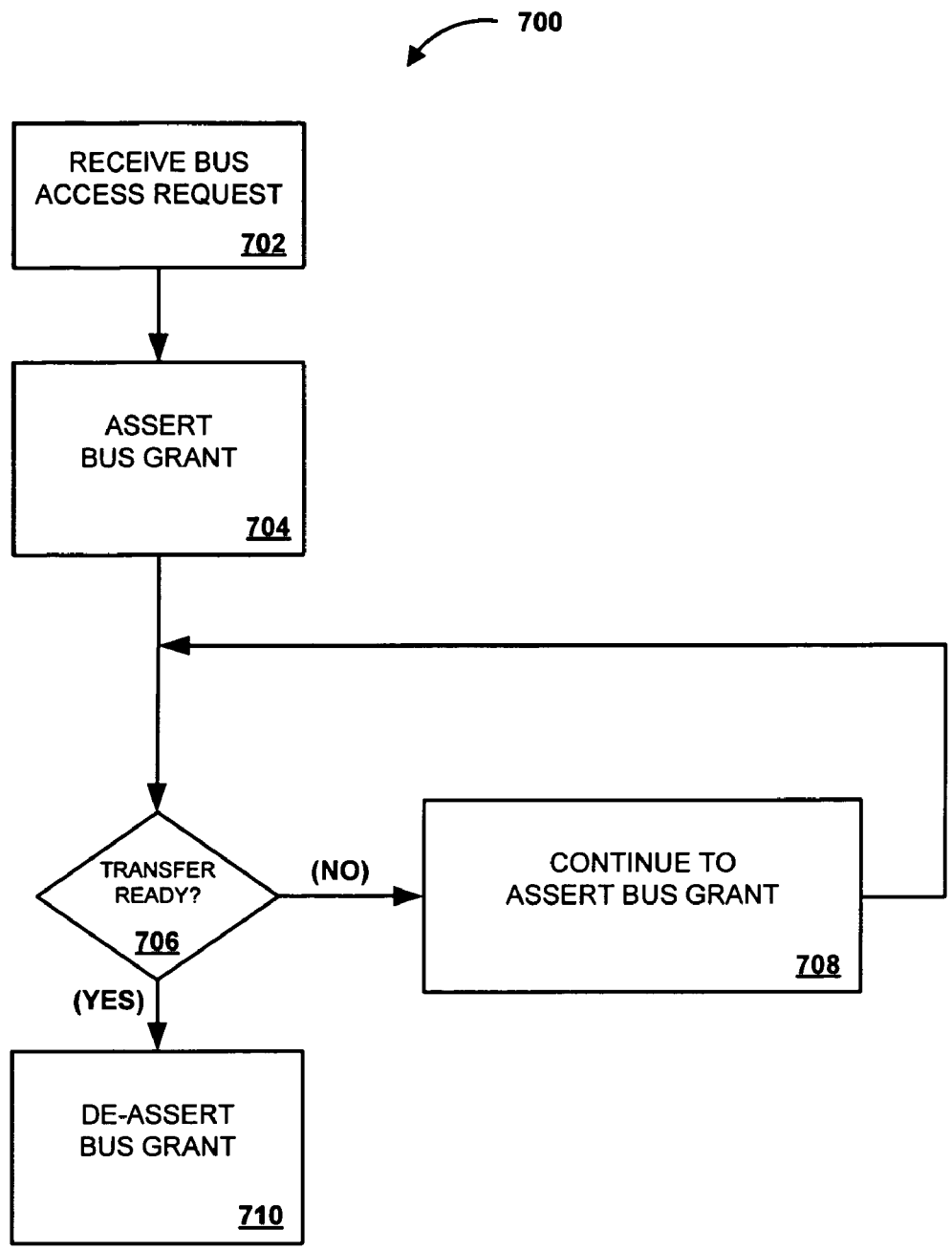
FIG. 7 is a block diagram of a methodology for ensuring a device maintains bus-mastership until a data transfer is ready.

In view of the foregoing structural and functional features described above, methodologies in accordance with various aspects of the present invention will be better appreciated with reference to FIGS. 6 and 7. While, for purposes of simplicity of explanation, the methodologies of FIGS. 6 and 7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 6 is a block diagram of a methodology 600 for controlling access to a bus. Methodology 600 is preferably embodied in logic employed by a bus arbiter. At 602, a bus access request is received from a first device. The bus access request may also be accompanied by a priority indication, e.g., a signal indicating whether the bus access request is a high/low priority request.

At 606, the arbiter asserts a bus grant to the first device responsive to the bus access request. The arbiter continues holding the bus grant until a predetermined event occurs. For example, a typical PCI controller would hold the bus grant until a frame (FRM#) is received from the first device. A problem with the typical PCI implementation is that if data cannot be obtained fast enough to complete a transfer, the transfer may be aborted and bus grant initiated to the next device. This can have adverse consequences for transfers that are time sensitive, such as data for QoS traffic or other time sensitive issues, such as those that have been described herein supra. However, an aspect of methodology 600 is that it can continue to assert bus grant after the first device asserts FRM#, thus ensuring a data transfer occurs by preventing another device from taking over the bus.

At 610, the arbiter receives a bus access request from a second device. For purposes of this example it is assumed that the first device has not completed its transfer. At 612, the priority level of the bus access request for the second device is determined. There are a number of techniques that may be used for determining the priority level of the second device's bus access request, any of which are suitably adaptable for methodology 600. For example, if no priority level is sent with the bus access request, then a default priority level can be used. The default priority level can be a priority level assigned to the second device, or all devices can be assumed to have equal priority. A signal can be employed to communicate the priority level to the arbiter. The signal can be sent on an unused (reserved) pin on the bus, or can be sent on a coupler external to the bus. The signal can be analog or digital. If the signal is a digital signal, it can use one or more bits to indicate priority level, e.g., a one bit signal could use binary 0 for low priority, binary 1 for high priority—a two bit signal can indicate four priority levels, etc.

If at 612 it is determined that the priority level of the second bus signal is greater than the priority level of the first bus signal (YES) then at 614 the arbiter grants the bus to the second device. The arbiter would de-assert bus grant to the first device, which because its latency timer has already expired would relinquish the bus allowing the second device to take over the bus.

If at 612 it is determined that the priority level of the second bus signal is not greater than the priority level of the first bus signal (NO), then as illustrated at 616 the arbiter continues to assert bus grant to the first device.

At 618, the arbiter determines if an entire data transfer is complete already or will definitively be completed without target retry. If (YES), then the arbiter de-asserts grant to the first device and at 614 asserts bus grant for the second device. If at 618 it is determined that the entire data transfer complete is not imminent (NO), then the arbiter continues to assert bus grant to the first device as shown at 618.

An aspect of methodology 600 is that it allows a bus arbiter to ensure a bus transfer occurs. An aspect of methodology 600 allows a bus arbiter to preempt a lower priority transfer, such as for example a transfer that is not yet time critical, with a higher priority and/or time critical transfer.

FIG. 7 is a block diagram of a methodology 700 for ensuring a device maintains bus-mastership until a data transfer is ready. Methodology 700 is preferably embodied in logic employed by a bus arbiter. At 702, a bus access request is received.

At 704, the arbiter asserts a bus grant responsive to the bus access request. The arbiter continues holding the bus grant until a predetermined event occurs. For example, a typical PCI controller would hold the bus grant until a frame (FRM#) is received from the first device. A problem with the typical PCI implementation is that if data cannot be obtained fast enough to initiate a transfer, the transfer may be aborted and bus grant initiated to the next device. This can have adverse consequences for transfers that are time sensitive, such as data for QoS traffic or other time sensitive issues, such as those that have been described herein supra. However, an aspect of methodology 700 is that it can continue to assert bus grant after the first device asserts FRM#, thus ensuring a data transfer occurs by preventing another device from taking over the bus.

At 706, the arbiter determines if if an entire data transfer is complete already or will definitively be completed without target retry. If (YES), then the arbiter de-asserts grant and at 710. If it is determined that the entire data transfer complete is not imminent (NO) at 706, then the arbiter continues to assert bus grant to the first device as shown at 708.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

What is claimed is:

1. A method for a bus arbiter to control access to a bus, comprising:
    determining by a first device a first priority level of first data to be transferred by the first device, wherein the first priority is based on a latency requirement of a first type of data corresponding to the first data;
    determining by a second device a second priority level of second data to be transferred by the second device, wherein the second priority level is based on a latency requirement of a second type of data corresponding to the second data;
    receiving a first bus access request from a first device requesting access to the bus for transferring the first data;
    receiving data representative of the first priority for the first data corresponding to the first bus access request separately from the first bus access request;
    asserting a first bus grant corresponding to the first bus access request to the first device until an entire packet transfer completion is imminent unless a bus access request is received with a higher priority level;
    receiving a second bus access request from the second device for transferring the second data;,
    receiving data representative of the second priority level for the second data separately from the first bus access request, the data representative of the priority of the first data, and the second bus access request, wherein the second priority level is a higher priority than the first priority level;
    immediately de-asserting the first bus grant associated with the first bus access request responsive to the second bus access request having a higher priority than the bus access request; and
    asserting a second bus grant associated with the second bus access request signal to the second device responsive to the second bus access request having a higher priority than the bus access request;
    wherein the first device is responsive to the de-asserting of the first bus grant to immediately relinquish the bus.

2. The method according to claim 1, wherein the data representative of the first priority is acquired from a signal received on an unused bus line.

3. The method according to claim 1, wherein the data representative of a first priority level is acquired from a signal received external to the bus.

4. The method according to claim 1, further comprising:
    setting a latency timer to zero.

5. The method according to claim 1, further comprising:
    determining a third priority level corresponding to a type of data for a third data to be transferred
    setting a latency timer to zero;
    receiving a third bus access request after the second bus access request;
    receiving data representative of the third priority level corresponding to the third bus access request separately from the third bus access request, wherein the third priority level is a lower priority than the second priority level corresponding to the second bus access request;
    maintaining the second bus grant associated with the second bus access request until a transfer associated with the second bus access request is completed, and then de-asserting the second bus grant associated with the second bus access request; and
    asserting a third bus grant associated with the third bus access request signal after de-asserting the second bus grant to the second device.

6. The method according to claim 1, further comprising:
    masking a second bus access request that has a lower priority until a transfer associated with the bus access request has completed.

7. The method according to claim 1 wherein the bus is one of the group consisting of a PCI version 3.0 compliant bus, a PCI version 2.0 compliant bus, a PCI version 2.1 compliant bus, a PCI version 2.2 complaint bus, a PCI version 2.3 compliant bus a PCI version 1.0 compliant bus, a miniPCl compliant bus and a CardBus compliant bus.

8. A system, comprising:
    a bus arbiter coupled to a bus for controlling access to the bus, wherein the bus is coupled to a first device and a second device;
    at least one coupler between the bus arbiter and the first device for asserting at least one of the group consisting of a bus access request signal and a bus grant signal between the bus arbiter and the first device;
    at least one coupler between the bus arbiter and the second device for asserting at least one of the group consisting of a bus access request signal and a bus grant signal between the bus arbiter and the second device;
    a first additional coupler for coupling the bus arbiter to the first device enabling the bus arbiter to receive a signal indicative of a first priority level corresponding to first data associated with a first bus access request from the first device separately from the bus access request from the first device; and
    a second additional coupler for coupling the bus arbiter to the second device enabling the bus arbiter to receive a signal indicative of a second priority level corresponding to a second data associated with a second bus access request from the second device separately from the bus access request from the second device;
    wherein the bus arbiter sets a latency timer for the first device and a latency timer for the second device to zero;

wherein the bus arbiter is responsive to a bus access request signal from the first device to assert and hold bus grant to the first device while data the first data is being transferred;

wherein the bus arbiter is responsive to receiving a second bus access request on the at least one coupler between the bus arbiter and the second device and a separate signal indicative of a second priority level corresponding to the second data being transferred associated with the second bus access request on the additional coupler for coupling the bus arbiter to the second device, wherein the arbiter is configured to immediately de-assert bus grant to the first device, and assert a bus grant to the second device responsive to the second priority level being higher than the first priority level;

wherein the first priority level is based on a latency requirement of the first data and the second priority level is based on a latency requirement of the second data; and wherein the first device relinquishes the bus immediately responsive to the first bus grant being de-asserted.

9. The system according to claim 8, further comprising a circuit for masking a subsequent bus access request for data that has a lower priority from the bus arbiter until a transfer associated with the first bus access request from the first device has completed.

10. The system according to claim 8, wherein the bus is one of the group consisting of a PCI version 3.0 compliant bus, a PCI version 2.0 compliant bus, a PCI version 2.1 compliant bus, a PCI version 2.2 complaint bus, a PCI version 2.3 compliant bus a PCI version 1.0 compliant bus, a miniPCl compliant bus and a CardBus compliant bus.

11. A multi-transceiver system, comprising:
a first wireless transceiver, the first wireless transceiver further comprising a latency timer;
a second wireless transceiver, the second wireless transceiver further comprising a latency timer;
a host unit comprising a host memory for storing packets for the first wireless transceiver and the second wireless transceiver;
a bus coupling the host memory to the first wireless transceiver and the second wireless transceiver; and
a bus arbiter for controlling access to the bus, the bus arbiter coupled to the host unit, first wireless transceiver and second wireless transceiver;
a first digital output coupling the first wireless transceiver to the bus arbiter;
a second digital output coupling the second wireless transceiver to the bus arbiter;
wherein the bus arbiter sets a latency timer for the first wireless transceiver and the latency timer for the second wireless transceiver to zero
wherein the bus arbiter is configured to grant a bus access request to the first wireless transceiver;
wherein the bus arbiter is configured to determine a first priority level for the bus access request form the first wireless device based on a separate signal received on the first digital output from the first wireless device;
wherein the bus arbiter is configured to immediately de-assert bus grant to the first wireless transceiver responsive to determining that a bus access request from the second wireless transceiver is for data that has a higher priority than data corresponding to the bus access request from the first wireless transceiver;
wherein the first wireless transceiver is responsive to the latency timer being set to zero to relinquish the bus immediately after the bus arbiter de-asserts bus grant;
wherein the first wireless device bases the first priority level on a latency requirement of data associated with the first bus access request; and
wherein the second wireless device bases the second priority level on a latency requirement of data associated with the second bus access request.

12. The multi-transceiver system according to claim 11, further comprising:
the host unit further comprising a buffer coupled to the bus;
wherein the host unit does not indicate it is ready to send the packet until the packet is transferred from the host memory to the buffer.

13. The multi-transceiver system according to claim 12, further comprising:
a central processing unit; and
a PCI version 3.0 compliant bus, a PCI version 2.0 compliant bus, a PCI version 2.1 compliant bus, a PCI version 2.2 complaint bus, a PCI version 2.3 compliant bus a PCI version 1.0 compliant bus, a miniPCl compliant bus and a CardBus compliant bus.

14. The multi-transceiver system according to claim 13, further comprising an interface to a distribution system;
wherein the interface receives the packet from the distribution system and stores the packet in the host memory.

* * * * *

UNITED STATES PATENT AND TRADEMARK OFFICE
CERTIFICATE OF CORRECTION

PATENT NO. : 7,467,245 B2
APPLICATION NO. : 11/187270
DATED : December 16, 2008
INVENTOR(S) : Corey Metsker It is certified that error appears in the above-identified patent and that said Letters Patent is hereby corrected as shown below:

IN THE CLAIMS:

In Claim 1, Column 15, Line 55, please delete final comma.

In Claim 5, Column 16, Line 15, please replace "transferred" with --transferred;--.

In Claim 7, Column 16, Line 40, please replace the first instance of "compliant bus" with --compliant bus,--.

In Claim 7, Column 16, Line 40, please replace "miniPCI" with --miniPCI--.

In Claim 8, Column 17, Line 3, please delete the first instance of "data".

In Claim 10, Column 17, Line 30, please replace the first instance of "compliant bus" with --compliant bus,--.

In Claim 10, Column 17, Line 30, please replace "miniPCI" with --miniPCI--.

In Claim 11, Column 18, Line 5, please replace "zero" with --zero;--.

In Claim 11, Column 18, Line 9, please replace "access request form" with --access request from--.

In Claim 13, Column 18, Line 38, please replace the second instance of "compliant bus" with --compliant bus,--.

UNITED STATES PATENT AND TRADEMARK OFFICE
CERTIFICATE OF CORRECTION

PATENT NO. : 7,467,245 B2
APPLICATION NO. : 11/187270
DATED : December 16, 2008
INVENTOR(S) : Corey Metsker It is certified that error appears in the above-identified patent and that said Letters Patent is hereby corrected as shown below:

In Claim 13, Column 18, Line 39, please replace "miniPCl" with --miniPCI--.

Signed and Sealed this

Seventh Day of April, 2009

JOHN DOLL
*Acting Director of the United States Patent and Trademark Office*